United States Patent [19]
Bergner et al.

[11] Patent Number: 5,382,613
[45] Date of Patent: Jan. 17, 1995

[54] LIGHT-STABLE POLYPHENYLENE ETHER MOLDING COMPOSITION WITH AN ANTISTATIC FINISH

[75] Inventors: Klaus-Dieter Bergner, Biberbach; Gerhard Pfahler, Augsburg, both of Germany

[73] Assignee: Hoechst AG, Frankfurt, Germany

[21] Appl. No.: 127,416

[22] Filed: Sep. 27, 1993

Related U.S. Application Data

[63] Continuation of Ser. No. 701,222, May 16, 1991, abandoned.

[30] Foreign Application Priority Data

May 16, 1990 [DE] Germany .................. 4015740

[51] Int. Cl.$^6$ .................. C08K 5/34; C08K 5/41; C08K 5/08
[52] U.S. Cl. .................. 524/102; 524/166; 524/359
[58] Field of Search .................. 524/95, 102, 359, 166

[56] References Cited

U.S. PATENT DOCUMENTS

| | | | |
|---|---|---|---|
| 3,925,509 | 12/1975 | Cooper et al. | 524/94 |
| 4,141,883 | 2/1979 | Soma et al. | 546/16 |
| 4,551,494 | 11/1985 | Lohmeijer | 524/89 |
| 4,562,220 | 12/1985 | Wiezer | 524/95 |

FOREIGN PATENT DOCUMENTS

| | | |
|---|---|---|
| 149454 | 7/1985 | European Pat. Off. . |
| 224701 | 6/1987 | European Pat. Off. . |
| 0146878 | 10/1989 | European Pat. Off. . |
| WO81/02021 | 7/1981 | WIPO . |

Primary Examiner—Kriellion S. Morgan
Attorney, Agent, or Firm—Connolly and Hutz

[57] ABSTRACT

A polyphenylene ether molding composition which contains at least one alkylsulfonate as antistatic and at least one light stabilizer of the formula III

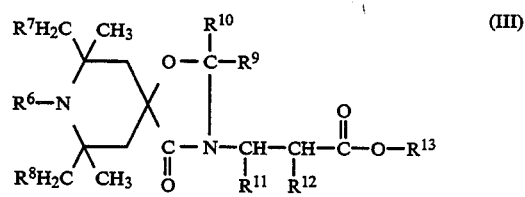

has better antistatic properties and greater light stability than is the case for simultaneous use of alkylsulfonates and previously known light stabilizers, such as, for example, tetramethylpiperidinyl derivatives.

6 Claims, No Drawings

LIGHT-STABLE POLYPHENYLENE ETHER MOLDING COMPOSITION WITH AN ANTISTATIC FINISH

This is a continuation of Ser. No. 07/701,222 filed May 16, 1991 now abandoned.

The invention relates to a polyphenylene ether molding composition which has been provided with an antistatic finish and is distinguished by increased UV light stability.

Polyphenylene ether molding compositions and blends are high-performance polymers of high melt viscosity and high softening point. They are preferably used in applications where high temperature resistance is required and are converted, inter alia, into films, fibers and injection moldings.

Polyphenylene ether molding compositions tend toward ongoing discoloration at the temperatures necessary for processing and, after conversion into moldings, due to extended exposure to UV light. In order to improve the color stability, stabilizing additives are added, if necessary, to said polymeric molding compositions. Polymer blends are known which comprise polyphenylene ether molding compositions and rubber-modified, impact-resistant polystyrene molding compositions and have improved stability to UV light due to the addition of a light-absorbing compound comprising hydroxybenzotriazoles, hydroxybenzophenone or substituted derivatives of these compounds in combination with an organonickel compound (cf. U.S. Pat. No. 3,925,509).

Furthermore, thermoplastic molding compositions comprising polyphenylene ether resins containing 2,2,6,6-tetramethylpiperidinyl derivatives as UV stabilizers are known (cf. WO-A-8,102,021). It is also known that polymers such as polyphenylene ethers can be stabilized against the harmful effect of light using 2,2,6,6-tetramethylpiperidinyl derivatives and optionally using UV stabilizers such as 2-hydroxybenzophenone (cf. U.S. Pat. No. 4,141,883).

The stabilizing action and the synergistic increase in action of a combination of certain ortho-hydroxy-substituted alkoxybenzophenones and certain aliphatic tetraalkyldipiperidinyl diesters and the molding compositions finished therewith are also known (cf. EP 146 878). Moldings made from polyphenylene ether molding compositions and blends which have been finished with a combination of these substances show a considerable decrease in their tendency to discolor on exposure to UV light.

A large number of various applications for polyphenylene ether molding compositions and blends requires stabilization against UV light and thus the addition of light-stabilizing additives. However, this must not impair other important properties of the thermoplastic molding compositions.

The use of antistatics having the structure R—SO$_3$X where R is alkyl or aralkyl having 5 to 25 carbon atoms, and X is an alkali metal, for improving the antistatic character of a polyphenylene ether molding composition or of a blend of polyphenylene ether and styrene polymer, as employed, inter alia, for the production of casings for electronic equipment, has been described (cf. U.S. Pat. No. 4,551,494).

It has been shown that the production of antistatically finished, UV-stabilized moldings from polyphenylene ether molding compositions and blends comprising polyphenylene ethers and unmodified or rubber-modified, high-impact polystyrene with simultaneous use of antistatics of the structure R—SO$_3$X and UV stabilizers from the group comprising aliphatic tetraalkyldipiperidinyl diesters causes mutual, undesired reductions in action. This interaction has a not inconsiderable adverse effect on the UV stability.

Surprisingly, it has now been found that antistatically finished polyphenylene ether molding compositions and blends of excellent UV-stability and good antistatic properties can successfully be prepared by using a mixture of one or more compounds of the structure R—SO$_3$X and at least one HALS stabilizer, alone or in combination with at least one o-hydroxyalkoxybenzophenone.

The invention thus relates to a polyphenylene ether molding composition essentially comprising a polymer which contains units of the formula I

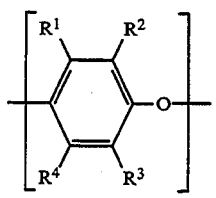

in which $R^1$, $R^2$, $R^3$ and $R^4$ are identical or different and are hydrogen, halogen, straight-chain or branched $C_1$-$C_4$-alkyl, phenyl or benzyl, and an antistatic, wherein the molding composition contains from 0.05 to 5 parts by weight, based on the polymer, of at least one compound of the formula II

in which
$R^5$ is a straight-chain or branched, aliphatic hydrocarbon carbon radical having 4 to 30 carbon atoms or a cycloaliphatic hydrocarbon radical having 6 to 30 carbon atoms,
M is an alkali metal or alkaline earth metal atom,
m is 1 or 2, and
n is 1, 2, 3 or 4, where each sulfonate group may be pendant or terminal, and
from 0.05 to 2.0 parts by weight, based on the polymer, of at least one compound of the formula III

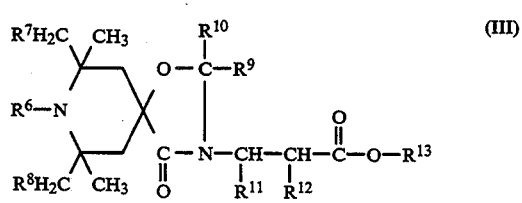

in which
$R^6$ is hydrogen, $C_1$-$C_8$-alkyl, $C_1$-$C_{18}$-alkoxy, acyl or hydroxyl,
$R^7$ and $R^8$, independently of one another, are hydrogen or $C_1$-$C_4$-alkyl,
$R^9$ is hydrogen, $C_1$-$C_{30}$-alkyl or benzyl,
$R^{10}$ is hydrogen, $C_1$-$C_{30}$-alkyl, $C_1$-$C_4$-alkylphenyl, chlorophenyl, 4-hydroxy-3,5-di-t-butylphenyl, phenyl, benzyl or naphthyl, or $R^9$ and $R^{10}$, together with the carbon atom to which they are bonded, are an optionally $C_1$-$C_4$-alkyl-substituted $C_5$-$C_{15}$-cycloalkylidene ring or a radical of the formula

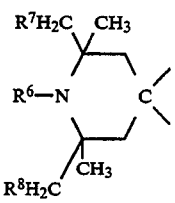

in which $R^6$, $R^7$ and $R^8$ are as defined above,
$R^{11}$ is hydrogen, methyl, phenyl or

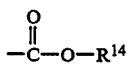

in which $R^{14}$ is $C_1$-$C_{21}$-alkyl, and
$R^{12}$ is hydrogen or methyl, and
$R^{13}$ is hydrogen, $C_1$-$C_{30}$-alkyl, $C_2$-$C_{30}$-alkylene, it being possible for the alkyl group or the alkylene group to be substituted by phenyl or naphthyl and-/or to be interrupted by oxygen or $C_1$-$C_4$-alkylimine, or is $C_5$-$C_{12}$-cycloalkyl, phenyl, $C_1$-$C_{12}$-alkylphenyl or an aliphatic hydrocarbon radical having 2 to 20 carbon atoms which may be interrupted by oxygen or $C_1$-$C_4$-alkylimine, and carries 1 to 3 further radicals of the formula

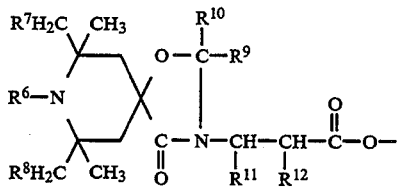

and/or $C_1$-$C_{21}$-alkylcarboxyl groups, where $R^6$, $R^7$, $R^8$, $R^9$, $R^{10}$, $R^{11}$ and $R^{12}$ are as defined above.

Preferred polyphenylene ether resins are homopolymers or copolymers containing units of the formula I

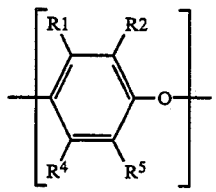

in which $R^1$, $R^2$, $R^3$ and $R^4$ are identical or different and are hydrogen, halogen, straight-chain or branched $C_1$-$C_{20}$-alkyl, $C_1$-$C_{20}$-alkoxy, phenyl or benzyl. The total number of monomer units is at least 20, preferably at least 50.

In general, the polyphenylene ether resins are self-condensing products made from monohydric, monocyclic phenols and prepared by reacting the phenols with oxygen in the presence of complex metal catalysts. The molecular weight is set via the reaction time, longer reaction times resulting in a higher average number of recurring units.

Examples of suitable phenolic monomers are 2,6-dimethylphenol; 2,6-diethylphenol; 2,6-dibutylphenol; 2,6-dilaurylphenol; 2,6-dipropylphenol; 2,6-diphenylphenol; 2-methyl-6-ethylphenol; 2-methyl-6-cyclohexylphenol; 2-methyl-6-tolylphenol; 2-methyl-6-methoxyphenol; 2-methyl-6-butylphenol; 2,6-dimethoxyphenol; 2,3,6-trimethylphenol; 2,3,5,6-tetramethylphenol; and 2,6-diethoxyphenol.

Examples of suitable polymers are: poly(2,6-dilauryl-1,4-phenylene) ether; poly(2,6-diphenyl-1,4-phenylene) ether; poly(2,6-dimethoxy-1,4-phenylene) ether; poly(2,6-diethoxy-1,4-phenylene) ether; poly(2-methoxy-6-ethoxy-1,4-phenylene) ether; poly(2-ethyl-6-stearyloxy-1,4-phenylene) ether; poly(2,6-dichloro-1,4-phenylene) ether; poly(2-methyl-6-phenyl-1,4-phenylene) ether; poly(2,6-dibenzyl-1,4-phenylene) ether; poly(2-ethoxy-1,4-phenylene) ether; poly(2-chloro-1,4-phenylene) ether; poly(2,6-dibromo-1,4-phenylene) ether, and copolymers of the abovementioned monomers and mixtures thereof, for example copolymers produced by reaction of 2,6-dimethylphenol with other phenolic monomers, such as, for example, 2,3,6-trimethylphenol or 2-methyl-6-butylphenol.

Particular preference is given to homopolymers of the abovementioned formula in which $R^2$ and $R^3$ are alkyl, particularly $C_1$-$C_4$-alkyl, in particular poly(2,6-dimethyl-1,4-phenylene) ether.

The molding composition according to the invention preferably contains a rubber-modified, high-impact poly(alkenyl)aromatic resin.

Suitable resins of this type are those which contain at least some units of the formula V

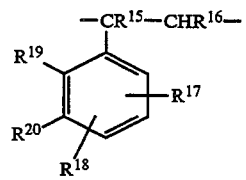

in which $R^{15}$ and $R^{16}$ are identical or different and are $C_1$-$C_6$-alkyl, $C_2$-$C_6$-alkenyl or hydrogen, $R^{17}$ and $R^{18}$ are identical or different and are chlorine, bromine, hydrogen or $C_1$-$C_6$-alkyl, $R^{19}$ and $R^{20}$ are identical or different and are hydrogen, $C_1$-$C_6$-alkyl or $C_2$-$C_6$-alkenyl, or $R^{19}$ and $R^{20}$ are connected to one another via hydrocarbon bridges and form a naphthyl group together with the ring.

Suitable resins contain styrene or homologs and analogs thereof. For example, alpha-methylstyrene, p-methylstyrene, 2,4-dimethylstyrene, chlorostyrene, dichlorostyrene, bromostyrene, dibromostyrene, p-tert.-butylstyrene, p-ethylstyrene, vinylxylene, divinylbenzene and vinylnaphthalene may be present in addition to styrene.

Preference is given to styrene-containing resins.

Possible rubber-modifiers which can be mixed or polymerized into the poly(alkenyl)aromatic resin are natural rubber, synthetic rubber, for example polyisoprene, polybutadiene, polychloroprene, ethylene-propylene-diene terpolymers (EPDM), styrene-butadiene copolymers (SBR), styrene-acrylonitrile copolymers (SAN), ethylenepropylene copolymers (EPR), acrylonitrile rubber, polyurethane rubber and polyorganosiloxanes (silicone) rubber.

The proportion of the high-impact component may vary very greatly. The weight ratio between polyphenylene ether and rubber-modified, poly(alkenyl)aromatic resin is from 5:95 to 95:5. In general, the proportion of rubber-modified poly(alkenyl)aromatic resin is in a range from 5 to 45 percent by weight, independent of the particular requirements for impact strength of the corresponding molding composition.

The molding composition may furthermore contain a plasticizer and/or an impact modifier in an amount of up to 30 parts by weight, based on 100 parts by weight of the polymer component.

Examples of suitable plasticizers are phenyl bisdodecyl phosphate, phenyl bisneopentyl phosphate, phenyl ethylene hydrogen phosphate, phenyl bis(3,5,5'-trimethylhexyl) phosphate, ethyl diphenyl phosphate, 2-ethylhexyl di(p-tolyl) phosphate, diphenyl hydrogen phosphate, bis(2-ethylhexyl) p-tolyl phosphate, tritolyl phosphate, bis(2-ethylhexyl) phenyl phosphate, tri(nonylphenyl) phosphate, phenyl methyl hydrogen phosphate, di(dodecyl) p-tolyl phosphate, tricresyl phosphate, triphenyl phosphate, dibutylene phenyl phosphate, 2-chloroethyl diphenyl phosphate, p-tolyl bis(2,5,5-trimethylhexyl) phosphate, 2-ethylhexyl diphenyl phosphate and diphenyl hydrogen phosphate.

Likewise suitable are polymeric plasticizers, and of these, in particular, polystyrene homopolymers, which can be added in an amount of up to 30 parts by weight, based on the polymer, depending on the effect to be achieved.

The molding composition according to the invention may contain one or more impact modifiers in the conventional amounts. Typical representatives are copolymers or terpolymers of alkenyl-aromatic mixtures of the abovementioned formula containing rubber or elastomeric components. Preference is given to linear block, graft or free-radical teleblock polymers or terpolymers of styrene and a hydrogenated or unhydrogenated diene.

The molding composition according to the invention contains at least one antistatic of the formula II

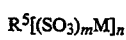   (II)

in which
R$^5$ is a straight-chain or branched, aliphatic hydrocarbon radical having from 4 to 30, preferably 4 to 20, in particular 10 to 20, carbon atoms, or a cycloaliphatic hydrocarbon radical having 6 to 30, preferably 6 to 20, carbon atoms,
M is an alkali metal or alkaline earth metal atom, preferably sodium,
m is 1 or 2, preferably 1, and
n is 1, 2, 3 or 4, preferably 1 or 2, where each sulfonate group may be pendant or terminal.

The antistatic is employed in an amount of from 0.05 to 5 parts by weight, based on the polymer. Amounts less than 0.05 parts by weight generally result in inadequate antistatic finishing, while amounts greater than 5 parts by weight generally do not result in any further improvement in the antistatic properties.

Furthermore, the molding composition according to the invention contains at least one compound of the formula III

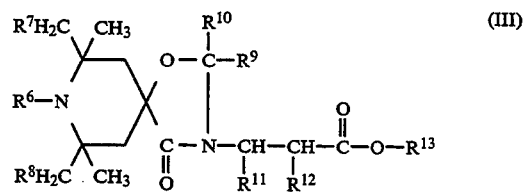

in which
R$^6$ is hydrogen, C$_1$-C$_8$-alkyl or C$_1$-C$_{18}$-alkoxy, preferably hydrogen or C$_1$-C$_4$-alkyl, or acyl or hydroxyl,
R$^7$ and R$^8$ independently of one another, are hydrogen or C$_1$-C$_4$-alkyl,
R$^9$ is hydrogen, C$_1$-C$_{30}$-alkyl or benzyl, and
R$^{10}$ is hydrogen, C$_1$-C$_{30}$-alkyl, benzyl, phenyl, C$_1$-C$_4$-alkylphenyl, chlorophenyl, 4-hydroxy-3,5-di-t-butylphenyl or naphthyl, or
R$^9$ and R$^{10}$ may alternatively, together with the carbon atom to which they are bonded, form an optionally C$_1$-C$_4$-alkyl-substituted C$_5$-C$_{15}$-cycloalkylidene ring or a radical of the formula

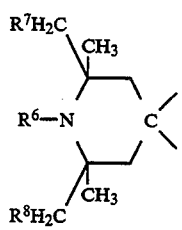

in which R$^6$, R$^7$ and R$^8$ are as defined above,
R$^{11}$ is hydrogen, methyl, phenyl or

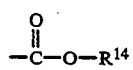

in which R$^{14}$ is C$_1$-C$_{21}$-alkyl,
R$^{12}$ is hydrogen or methyl, preferably hydrogen,
R$^{13}$ is hydrogen, C$_1$-C$_{30}$-alkyl, preferably C$_1$-C$_{20}$-alkyl, C$_2$-C$_{30}$-alkylene, preferably C$_2$-C$_{20}$-alkylene, it being possible for the alkyl group or alkylene group to be substituted by phenyl or naphthyl and/or to be interrupted by oxygen or C$_1$-C$_4$-alkylimine, or is C$_5$-C$_{12}$-cycloalkyl, phenyl or C$_1$-C$_{12}$-alkylphenyl, or
R$^{13}$ is an aliphatic hydrocarbon radical having 2 to 20 carbon atoms which may be interrupted by oxygen or C$_1$-C$_4$-alkylimine and carries 1 to 3 further radicals of the formula

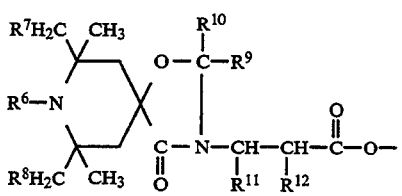

and/or C$_1$-C$_{21}$-alkylcarboxyl groups, where R$^6$, R$^7$, R$^8$, R$^9$, R$^{10}$, R$^{11}$ and R$^{12}$ are as defined above, but R$^{13}$ is preferably C$_2$-C$_{20}$-alkyl.

The compound of the formula III is added in an amount of from 0.05 to 2.0 parts by weight, preferably from 0.05 to 1.0 part by weight, based on the polymer.

In order to further increase the light stability, the molding composition according to the invention may contain at least one compound of the formula IV

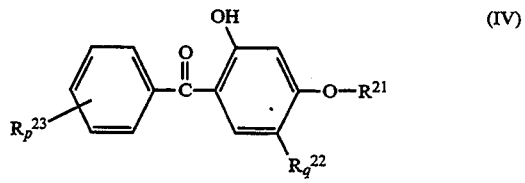

in which

R$^{21}$ is hydrogen, C$_1$–C$_{25}$-alkyl or C$_6$–C$_{10}$-aryl,

R$^{22}$ and R$^{23}$, independently of one another, are hydrogen, hydroxyl, C$_1$–C$_{10}$-alkoxy, C$_1$–C$_{25}$-alkyl or C$_6$–C$_{10}$-aryl, and p and q, independently of one another, are zero or an integer from 1 to 5.

The amount of the compound of the formula IV in the molding composition is from 0.3 to 10 parts by weight, preferably from 0.3 to 5 parts by weight, per 100 parts of polymer.

In addition to the compounds to be used according to the invention, the polyphenylene ether molding composition may contain conventional additives, such as, for example, antioxidants, processing stabilizers, light screens, lubricants, fillers, flameproofing agents, processing assistants, pigments, colorants, dyes, mold-release agents, flow improvers or odor suppressants.

The polyphenylene ether molding compositions according to the invention can be converted into plastic articles by any process known for polyphenylene ethers. Examples which may be mentioned are incorporation of a dry blend or of a solution of additives into the polyphenylene ether molding composition by extrusion at a temperature of from 230° to 350° C., subsequently cooling and comminuting the extrudate and converting the resultant granules into injection moldings at the abovementioned temperature.

The polyphenylene ether molding composition according to the invention can be employed in any application for which the use of polyphenylene ether molding compositions and blends is known or for which these polymers are used. It is particularly suitable for articles intended for outdoor use during which they are exposed to sunlight, for articles used indoors and exposed to strong artificial light, and in articles which, in addition to UV stability, must have an antistatic finish, such as, for example, casings of electronic assemblies and equipment.

EXAMPLES 1 and 2

A base mixture comprising
50.0 parts by weight of poly(2,6-dimethyl-4-phenylene) ether,
50.0 parts by weight of a polybutadiene-modified, high-impact polystyrene,
1.5 parts by weight of a low-density polyethylene,
0.15 part by weight of zinc oxide,
0.15 part by weight of zinc sulfide, and
0.5 part by weight of diphenyldioctyl phthalate was mixed with
2.5 parts by weight of an antistatic of the sodium alkanesulfonate type, with the amounts indicated in Table 1 of 2-hydroxy-4-n-octoxybenzophenone and with a compound of the formula III, the mixture was extruded (bulk temperature 260° C.), and the extrudate was granulated. The granules were subsequently injection-molded (bulk temperature 255° C., mold temperature 70° C.) to give plates measuring 80×80 mm with a thickness of 1 mm. In the same way, injection-molded plates having the same dimensions but containing no antistatic and/or light stabilizer were produced.

Some of the test specimens (injection-molded plates) produced in this way were exposed to light in a weathering instrument at a black card temperature of 45° C.±5° C. in accordance with DIN 53 387-1-A-X. The change in the color difference ($\Delta E^*_{diff}$) of the exposed surface of the test specimens compared with the initial state was measured at various time intervals (DIN 53 236/DIN 6174). The standard color values for standard light type C were determined by means of a colorimeter.

In parallel to the exposure experiments, the antistatic finishing was determined by means of the surface resistance R$_{SA}$ in accordance with DIN 53 482 ( electrode arrangement A), in each case after the unexposed test specimens (1 mm injection-molded plates) had been stored for 3 days in a standardized climate (23° C./50% relative atmospheric humidity).

TABLE 1

Change in color difference $\Delta E^*_{diff}$, surface resistance R$_{SA}$

| Basic recipe plus | Comparisons | | | Examples | |
|---|---|---|---|---|---|
| | A | B | C | 1 | 2 |
| Compound II[1] | — | — | 2.5 | 2.5 | 2.5 |
| Compound III[2] | — | — | — | 0.2 | 0.3 |
| Compound IV[3] | — | 2.0 | 2.0 | 2.0 | 2.0 |
| Compound[4] | — | 0.2 | 0.2 | — | — |
| $\Delta E^*_{diff}$ (DIN 53 236/6174) after exposure time | | | | | |
| 150 hours | 4.5 | 1.2 | 2.8 | 1.4 | 1.2 |
| 300 hours | 10.5 | 4.9 | 8.1 | 4.8 | 4.2 |
| 450 hours | 18.3 | 10.8 | 15.9 | 10.6 | 9.4 |
| surface resistance (DIN 53482) | | | | | |
| R$_{SA}$ (Ω) | 10$^{16}$ | 10$^{16}$ | 10$^{12}$ | 10$^{10}$ | 10$^{10}$ |

[1] Sodium alkanesulfonate
[2] 2,2,4,4-Tetramethyl-20-(β-lauryloxy/myristyloxy-carbonylethyl)-7-oxa-3,20-diaza-21-oxodispiro-[5.1.11.2]heneicosane
[3] 2-Hydroxy-4-n-octoxybenzophenone
[4] 2,2,6,6,-Tetramethyldipiperidinyl sebacate.

The low values for $\Delta E^*_{diff}$ of the molding compositions according to the invention (Examples 1 and 2) compared with Example C for simultaneous good antistatic finishing show that there are no interactions between the UV stabilizer mixture according to the invention and the antistatic which reduce the action (as in Examples B and C).

At the same time, the good UV-stabilizing effect of the UV-stabilizer mixture according to the invention compared with A becomes clear.

EXAMPLES 3 to 8

The basic recipe of Examples 1 and 2 was mixed with the amounts stated in Table 2 of the compounds II, III and IV. The test specimens were produced and the tests carried out as in Examples 1 and 2. The results are shown in Table 2.

TABLE 2

Change in color difference ΔE*$_{diff}$, surface resistance R$_{SA}$

| Basic recipe plus | Comparisons D | Examples 3 | 4 | 5 | 6 | 7 | 8 |
|---|---|---|---|---|---|---|---|
| Compound II | 2.5 | 2.5 | 2.5 | 2.5 | 2.5 | 2.5 | 2.5 |
| Compound III | — | 0.2 | 0.2 | 0.5 | 1.0 | 0.3 | 0.4 |
| Compound IV | — | 1.5 | 1.0 | 2.0 | 2.0 | 3.0 | 4.0 |
| ΔE*$_{diff}$(DIN 53 236/6174) after exposure time | | | | | | | |
| 150 hours | 4.9 | 1.9 | 2.1 | 1.2 | 1.0 | 1.8 | 1.1 |
| 300 hours | 11.0 | 6.9 | 8.7 | 3.8 | 3.3 | 4.3 | 3.5 |
| 450 hours | 20.1 | 12.2 | 13.4 | 8.5 | 7.5 | 9.5 | 7.6 |
| surface resistance (DIN 53482) | | | | | | | |
| R$_{SA}$ (Ω) | $10^{10}$ | $10^{10}$ | $10^{10}$ | $10^{10}$ | $10^{10}$ | $10^{10}$ | $10^{10}$ |

EXAMPLES 9 to 11

The basic recipes of Examples 1 and 2 each additionally contained 12.0 parts by weight of an isopropylated triphenyl phosphate as flameproofing finish, and were mixed with the amounts stated in Table 3 of the compounds II, III and IV. The test specimens were produced and the tests carried out as in Examples 1 and 2. The results are shown in Table 3.

TABLE 3

Change in color difference ΔE$_{diff}$*, surface resistance R$_{SA}$

| Basic recipe plus | Examples 9 | 10 | 11 |
|---|---|---|---|
| Compound II | 2.5 | 2.5 | 2.5 |
| Compound III | 0.2 | 0.2 | 0.2 |
| Compound IV | | | |
| Type a | 2.0 | — | — |
| Type b | — | 2.0 | — |
| Type c | — | — | 2.0 |
| ΔE$_{diff}$* (DIN 53 236/6174) after exposure time | | | |
| 150 hours | 1.6 | 1.6 | 3.1 |
| 300 hours | 4.1 | 4.7 | 7.6 |
| 450 hours | 9.4 | 10.3 | 13.3 |
| surface resistance (DIN 53482) | $10^{11}$ | $10^{11}$ | $10^{11}$ |
| R$_{SA}$ (Ω) | | | |

IVa 2,4-Dihydroxybenzophenone

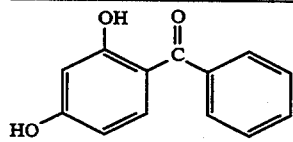

IVb 4-Methoxy-2-hydroxybenzophenone

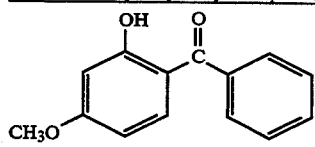

IVc 4-Dodecyl-2-hydroxybenzophenone

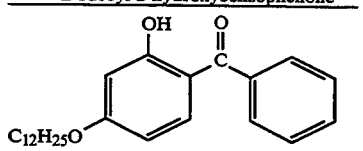

EXAMPLES 12 to 14

A mixture of
- 60.0 parts by weight of poly (2,6-dimethyl-4-phenylene ether) resin,
- 40.0 parts by weight of a polybutadiene-modified, high-impact polystyrene,
- 1.5 parts by weight of a low density polyethylene,
- 0.15 parts by weight of zinc oxide,
- 0.15 parts by weight of zinc sulfide and
- 0.5 part by weight of diphenyldioctyl phthalate was mixed with
- 2.5 parts by weight of an antistatic of the sodium alkanesulfonate type (II) and with a compound of the formula (III) in the amounts stated in Table 4, the mixture was extruded, and the extrudate was converted into plates measuring 80×80 mm with a thickness of 1 mm. The production temperatures for the test specimens were matched to the modified composition as follows:
  extrusion/bulk temperature 270° C.;
  injection molding/bulk temperature 260° C./mold temperature 90° C.

Otherwise, the production of test specimens and the testing were carried out in accordance with Examples 1 and 2. The results are shown in Table 4.

TABLE 4

| Basic recipe plus | Comparisons E | Examples 12 | 13 | 14 |
|---|---|---|---|---|
| Compound II | 2.5 | 2.5 | 2.5 | 2.5 |
| Compound III | — | 0.2 | 1.0 | 2.0 |
| ΔE*$_{diff}$(DIN 53 236/6174) after exposure time | | | | |
| 150 hours | 4.7 | 2.1 | 1.4 | 1.0 |
| 300 hours | 10.4 | 6.4 | 4.3 | 3.1 |
| 450 hours | 22.1 | 14.3 | 10.2 | 7.6 |
| surface resistance (DIN 53482) | | | | |
| R$_{SA}$ (Ω) | $10^{10}$ | $10^{10}$ | $10^{10}$ | $10^{10}$ |

I claim:
1. A polyphenylene ether molding composition essentially comprising a polymer which contains units of the formula I

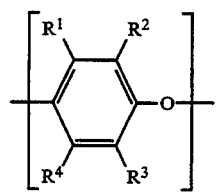

in which $R^1$, $R^2$, $R^3$ and $R^4$ are identical or different and are hydrogen, halogen, straight-chain or branched $C_1$–$C_{20}$-alkyl, $C_1$–$C_{20}$-alkoxy, phenyl or benzyl, wherein the molding composition contains from 0.05 to 5 parts by weight based on the polymer, of at least one compound of the formula II $$R^5[(SO_3)_mM]_n \qquad (II)$$

in which
$R^5$ is a straight-chain or branched, aliphatic hydrocarbon radical having 4 to 30 carbon atoms or a cycloaliphatic hydrocarbon radical having 6 to 30 carbon atoms, M is an alkali metal or alkane earth metal atom, m is 1 or 2, and n is 1, 2, 3 or 4, where each sulfonate group may be pendent or terminal, from 0.05 to 2.0 pans by weight, based on the polymer, of at least one compound of the formula III

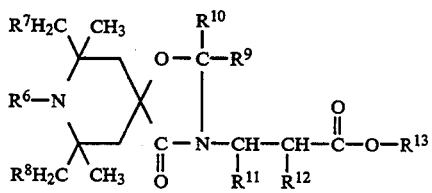 (III)

in which

R$^6$ is hydrogen, C$_1$-C$_8$-alkyl, C$_1$-C$_{18}$-alkoxy, acyl or hydroxyl,

R$^7$ and R$^8$, independently of one another, are hydrogen or C$_1$-C$_4$-alkyl, R$^9$ is hydrogen, C$_1$-C$_{30}$-alkyl or benzyl, R$_{10}$ is hydrogen, C$_1$-C$_{30}$-alkyl, C$_1$-C$_4$-alkylphenyl, chlorophenyl, 4-hydroxy-3,5-di-t-butylphenyl, benzyl, phenyl or naphthyl, or R$^9$ and R$^{10}$, together with the carbon atom to which they are bonded, are an optionally C$_1$-C$_4$-alkyl-substituted C$_5$-C$_{15}$-cycloalkylidene ring or a radical of the formula

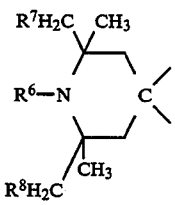

in which R$^6$, R$^7$ and R$^8$ are as defined above,

R$^{11}$ is hydrogen, methyl, phenyl or

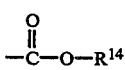

in which R$^{14}$ is C$_1$-C$_{21}$-alkyl, and

R$^{12}$ is hydrogen or methyl, and

R$^{13}$ is hydrogen, C$_1$-C$_{30}$-alkyl, C$_2$-C$_{30}$-alkylene, it being possible for the alkyl group or the alkylene group to be substituted by phenyl or naphthyl and-/or to be interrupted by oxygen or C$_1$-C$_4$-alkylimine, or is C$_5$-C$_{12}$-cycloalkyl, phenyl, C$_1$-C$_{12}$-alkylphenyl or an aliphatic hydrocarbon radical having 2 to 20 carbon atoms which may be interrupted by oxygen or C$_1$-C$_4$-alkylimine, and carries 1 to 3 further radicals of the formula

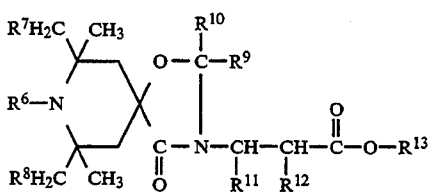

and/or C$_1$-C$_{21}$-alkylcarboxyl groups, where R$^6$, R$^7$, R$^8$, R$^9$, R$^{10}$, R$^{11}$ and R$^{12}$ are as defined above and from 0.3 to 10 parts by weight, based on the polymer, of at least one compound of the formula IV

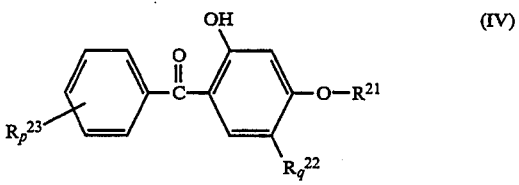 (IV)

in which R$^{21}$ is hydrogen, C$_1$-C$_{25}$-alkyl or C$_6$-C$_{10}$-aryl,

R$^{22}$ and R$^{23}$, independently of one another, are hydrogen, hydroxyl, C$_1$-C$_{10}$-alkoxy, C$_1$-C$_{25}$-alkyl or C$_6$-C$_{10}$-aryl, and p and q, independently of one another, are zero or an integer from 1 to 5.

2. A molding composition as claimed in claim 1, which additionally contains from 5 to 95 parts by weight, based on the polymer, of a rubber-modified poly(alkenyl)aromatic resin which contains at least some units of the formula V

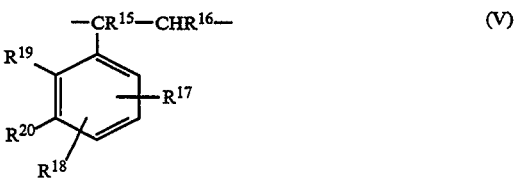 (V)

in which

R$^{15}$ and R$^{16}$ are identical or different and are hydrogen C$_1$-C$_6$-alkyl, or C$_2$-C$_6$-alkenyl, R$^{17}$ and R$^{18}$ are identical or different and are chlorine, bromine, hydrogen or C$_1$-C$_6$-alkyl, R$^{19}$ and R$^{20}$ are identical or different and are hydrogen, C$_1$-C$_6$-alkyl or C$_2$-C$_6$-alkenyl, or R$^{19}$ and R$^{20}$ form a naphthyl group together with the ring.

3. A molding composition as claimed in claim 2, which additionally contains up to 30 parts by weight, based on the polymer, of a plasticizer or impact modifier.

4. A molding composition as claimed in claim 2, wherein the rubber-modified poly(alkenyl)aromatic resin is a resin containing styrene units.

5. A molding composition as claimed in claim 2, wherein the rubber-modified poly(alkenyl) aromatic resin is a resin containing styrene units and butadiene units.

6. A polyphenylene ether molding composition as claimed in claim 1, wherein the compound of formula III is 2,2,4,4-tetramethyl-20-(β-lauryloxy/myristyloxy-carbonylethyl)-7-oxa-3,20-diaza-21-oxo-dispiro-[5.1.11.2]-heneicosane.

* * * * *